Figure 1:
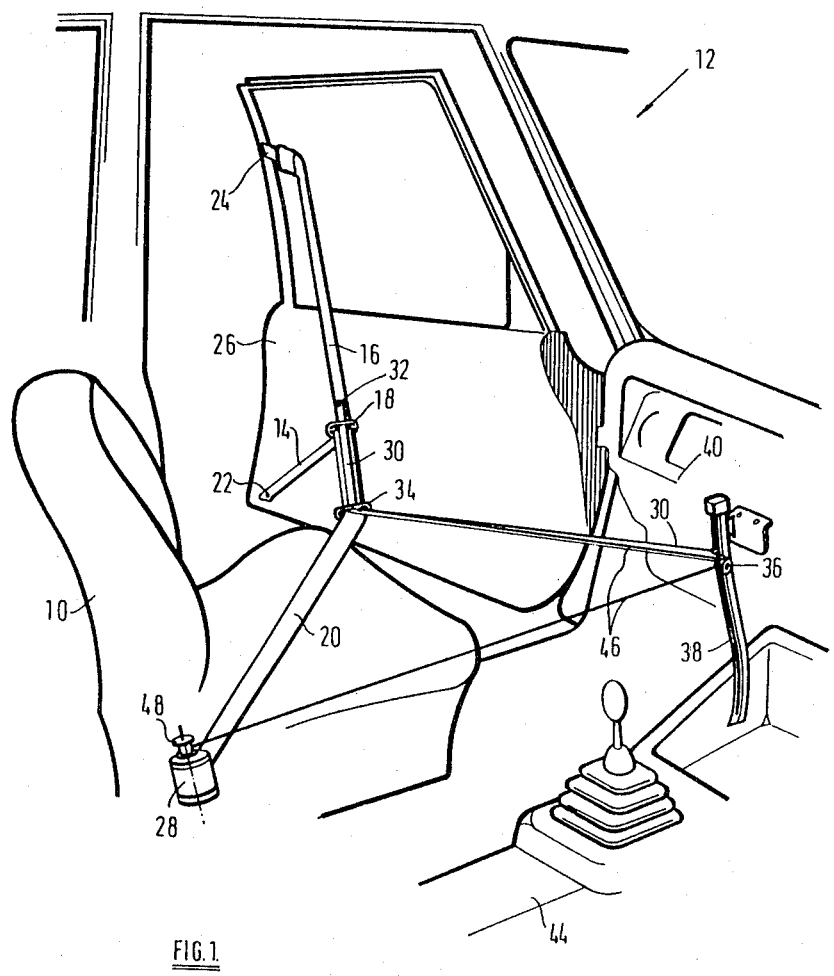

United States Patent [19]

Packington

[11] 4,423,887
[45] Jan. 3, 1984

[54] PASSIVE SAFETY BELT SYSTEM

[75] Inventor: Simon D. Packington, Bognor Regis, England

[73] Assignee: Britax (Wingard) Limited, England

[21] Appl. No.: 333,467

[22] Filed: Dec. 22, 1981

[30] Foreign Application Priority Data

Jan. 10, 1981 [GB] United Kingdom ............... 8100740

[51] Int. Cl.³ ............................................ B60R 21/10
[52] U.S. Cl. .................................. 280/802; 280/804; 297/468
[58] Field of Search ............... 280/802, 803, 804, 807, 280/808; 297/468, 369, 481

[56] References Cited

U.S. PATENT DOCUMENTS

| | | | |
|---|---|---|---|
| 3,915,473 | 10/1975 | Lindblad | 280/804 |
| 4,203,618 | 5/1980 | Frank | 280/804 |
| 4,230,342 | 10/1980 | Stephenson | 280/804 |

FOREIGN PATENT DOCUMENTS 1388382 3/1975 United Kingdom ............... 280/803

Primary Examiner—Bruce H. Stoner, Jr.
Assistant Examiner—John A. Carroll
Attorney, Agent, or Firm—Hayes, Davis & Soloway

[57] ABSTRACT

A passive safety belt system has a lap element 14, a diagonal element 16 and a common element 20 interconnected by a ring 18. First puller mechanism 30 is connected to the shoulder element 16 at 32 and then runs through the ring 18 and a second ring 34 which is slidable on the common strap 20. The other end of the first puller mechanism 30 is connected to a traveller 36 on a track 38. Second puller mechanism 46 has one end connected to the second ring 34 and then runs through the traveller 36 to a spool 48 coupled to a spindle of a retractor 28 for the common element 20, so as to pay out the second puller mechanism as the common strap is wound in. The effect of this is to move the point of action of the first puller mechanism 30 nearer to the center of the car without interfering with retraction of the common strap 20 on to the retractor 28.

10 Claims, 2 Drawing Figures

PASSIVE SAFETY BELT SYSTEM

This invention relates to a passive safety belt system for a motor vehicle of the type in which the belt is moved away from the body of the user when the corresponding vehicle door is opened.

Co-pending Application No. 256,530 relates to a motor vehicle having a front-hinged door and an adjacent seat provided with a safety belt system comprising a shoulder strap, a lap strap and a common strap interconnected to form a three-point safety belt, the free ends of the shoulder, lap and common straps being connected to respective anchorage means, one of which incorporates an inertia reel, the anchorage means for the lap strap and the common strap means each being connected to a respective one of the first point on the door in proximity to the bottom rear corner thereof and a location on the vehicle inboard of and adjacent to the bottom of the back of the seat and the anchorage means for the shoulder strap being connected to a point above the anchorage means for the lap strap such that its location relative to the anchorage for the lap strap is not affected by opening of the door, the safety belt system further comprising puller means interconnecting a point on the safety belt with a point on the vehicle such that, when the door is opened the puller means applied a force to the shoulder strap thereby to displace the junction between the lap, shoulder and common straps out of the plane containing the two anchorage means and the guide means in a direction away from the seat.

When the invention described in the foregoing application is applied to a safety belt system of the type in which the lap and shoulder straps are attached to the rear edge of the door, the puller means may be arranged to interconnect a point on the safety belt which is inboard of the seat when the door is closed and a point on the vehicle in front of and above the knees of an occupant of the seat. The present invention is concerned with an improvement in or modificaion of a safety belt system of this type.

The present invention provides a safety belt system for use with a seat located adjacent to a front-hinged door of a motor vehicle, the system comprising a shoulder strap, a lap strap and a common strap interconnected to form a three-point safety belt, the free ends of the shoulder and lap straps being connected to the rear edge of said door in proximity to the top and bottom corners thereof and the free end of the common strap being guided, at a location inboard of and adjacent to the bottom of the back of the seat, on to an inertia reel, the system further comprising first flexible puller means interconnecting a point on the safety belt which is inboard of the seat when the door is closed and a point on the vehicle in front of and above the knees of an occupant of the seat, second flexible puller means extending from a point on the vehicle in front of and above the knees of the occupant of the seat to guide means which is slidable on both the first puller means and the common strap so as to vary the location along their length at which they are permitted to diverge from one another, and retractor means coupled to said inertia reel for reducing the effective length of the second puller means as said common strap is protracted from said inertia reel.

The retractor means may comprise a spool which forms part of the inertia reel and is coupled to the spindle thereof so as to be driven thereby.

The point on the vehicle to which the second puller means is attached may be the same as that to which the first puller means is attached. In one form of the invention, this point is movable, for example in the form of a slider mounted on a track, the end of which nearer to the door is higher than the other end, or the end of an arm mounted on a transverse pivot axis, the end of which nearest the door is lower than the other end.

In a preferred form of the invention the lap and shoulder straps are formed as a single continuous length running freely through a guide member which is attached to the end of the common strap, and the first puller means runs freely through the guide member and is attached to the shoulder strap at a point spaced from the guide member. The guide member may comprise a ring which need not be circular. Alternatively, it may be a more complex component having separate apertures for the lap and diagonal straps and the puller member respectively.

In one form of the invention, the puller means comprises a flexible element made, for example, of webbing or cord.

Figure 2:
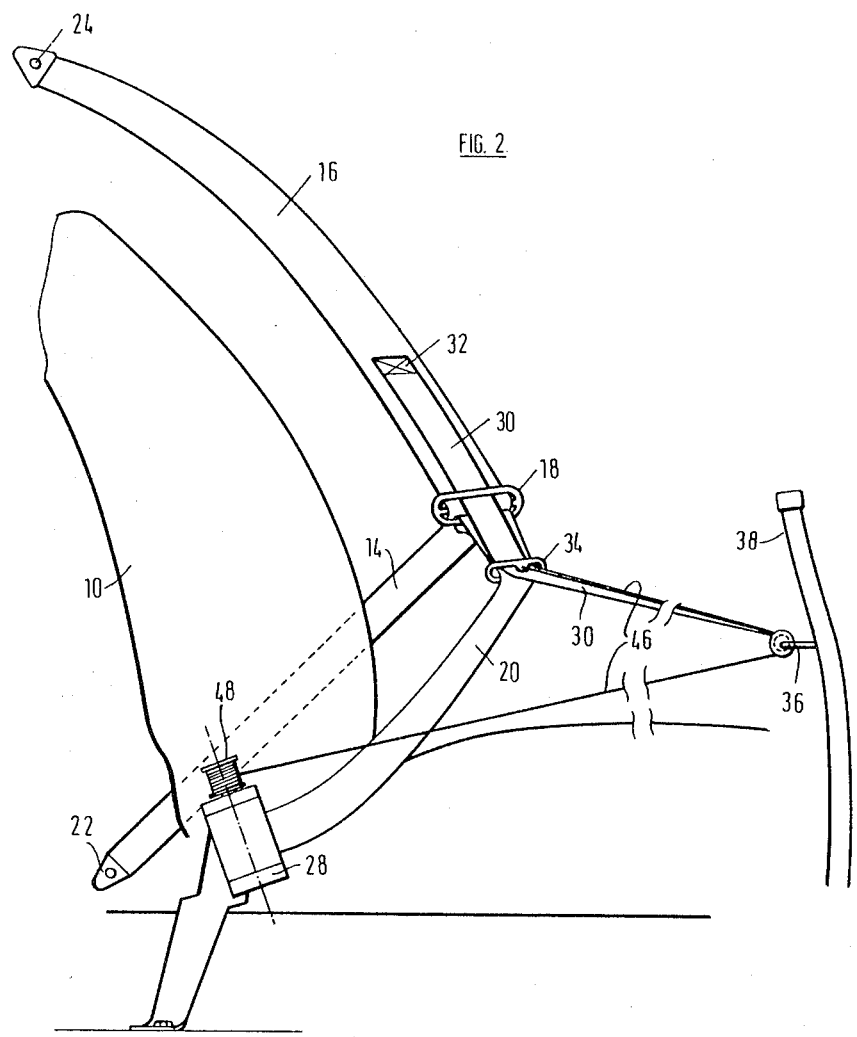

An embodiment of the invention will now be described, by way of example, with reference to the accompanying drawings, in which:

FIG. 1 is a perspective view of part of the interior of a motor car having a seat fitted with a safety belt system in accordance with the invention, with the door adjacent to such seat open; and FIG. 2 is a perspective view on a larger scale of the safety belt system and seat shown in FIG. 1 in the position which it occupies when the adjacent door is partially closed.

The drawings show one of the front seats 10 of a motor car 12 in accordance with the invention. A safety belt for the occupant of the seat 10 consists of a single length of webbing, forming the lap element 14 and the shoulder element 16, which runs freely through a flattened ring 18 which is in turn connected to one end of another length of webbing forming the common element 20 of the safety belt. The free ends of the lap and shoulder elements 14 and 16 are connected to respective anchorages 22 and 24 near the bottom and top rear corners of the adjacent door 26 of the car 12. The free end of the common element 20 is connected to an inertia reel 28 mounted on the front of the car on the inboard side of the seat 10 and adjacent to the back thereof.

A piece of webbing 30 has one end attached to a location 32 (FIG. 2) on the shoulder element 16 spaced from the ring 18. The webbing 30 runs through the ring 18 and then through a second flattened ring 34, which is freely slidable on the common element 20. The other end of the webbing 30 is connected to a traveller 36 mounted on a track 38 which extends from the fascia 40 of the car 12 downwards towards the transmission tunnel 44 thereof.

A cord 46 has one end connected to the second ring 34 and runs through a pulley on the traveller 36 to a retractor spool 48 which is coupled to the shaft of the inertia reel 28 so as to retract the cord 46 as the common element 20 is protracted and vice versa.

In use, when the door 26 is closed, the various elements 14, 16 and 20 of the safety belt system take up a configuration similar to that shown in FIG. 2 but with the rings 18 and 34 abutting one another and in close priximity to the inertia reel 28, and the traveller 36 near the bottom of the track 38. The elements 14, 16 and 20 are in the position of normal use in which the cord 46 and the length of webbing 30 lie along or in close proximity to the transmission tunnel 44.

When the door 26 is opened, the resulting pull on the lap and shoulder elements 14 and 16, particularly the latter, causes webbing to be drawn off the reel 28. As the piece of webbing 30 tightens, it pulls the traveller 36 to the top of the track 38. Thereafter, the tension in the shoulder element 16 and the piece of webbing 30 tends to lift the ring 18 away from the seat 10.

At the same time, the cord 46 is wound on to the spool 48, pulling the ring 34 away from the ring 18 on the common element 20. The result is that instead of running straight from the position occupied by the ring 18 to the reel 28 when the door 26 is opened, the intermediate part of the common element 20 is held further away from the seat 10.

When the car door 26 closes again, the retractor spring of the reel 28 causes the common element 20 to be rewound on to the reel, at the same time paying out the cord 46. The various elements of the system thus return to their original positions.

I claim:

1. In a motor vehicle having a seat located adjacent to a front-hinged door, a safety belt system comprising a shoulder strap, a lap strap and a common strap interconnected to form a three-point safety belt, the free ends of the shoulder and lap straps being connected to the rear edge of said door in proximity to the top and bottom corners thereof and the free end of the common strap being guided, at a location inboard of and adjacent to the bottom of the back of the seat, on to an inertia reel, the system further comprising first flexible puller means interconnecting a point of the safety belt which is inboard of the seat when the door is closed and a point on the vehicle in front of and above the knees of an occupant of the seat, second flexible puller means extending from a point on the vehicle in front of and above the knees of the occupant of the seat, when the door is open, to guide means which is slidable on both the first puller means and the common strap so as to vary the location along their length at which they are permitted to diverge from one another, and retractor means coupled to said inertia reel for reducing the effective length of the second puller means as said common strap is protracted from said inertia reel.

2. A motor vehicle according to claim 1, wherein the second puller means is attached to a common point on the vehicle as the first puller means.

3. A motor vehicle according to claim 2, wherein, said common point of attachment of the puller means is movable.

4. A motor vehicle according to claim 3, wherein the common point of attachment of the puller means comprises a slider mounted on a track, the end of which nearer to the door is higher than the other end thereof.

5. A motor vehicle according to claim 1, wherein the lap and shoulder straps are formed as a single continuous length running freely through a guide member which is attached to the common strap and the first puller means runs freely through the guide member and is attached to the shoulder strap at a point spaced from the guide member.

6. In a motor vehicle having a seat located adjacent to a front-hinged door of a motor vehicle, a safety belt system comprising a shoulder strap, a lap strap and a common strap interconnected to form a three-point safety belt, the free ends of the shoulder and lap straps being connected to the rear edge of said door in proximity to the top and bottom corners thereof and the free end of the common strap being guided, at a location inboard of and adjacent to the bottom of the back of the seat, on to an inertia reel, the system further comprising first flexible puller means interconnecting a point on the safety belt which is inboard of the seat when the door is closed and a point on the vehicle in front of and above the knees of an occupant of the seat, second flexible puller means extending from a point on the vehicle in front of and above the knees of the occupant of the seat, when the door is open, to guide means which is slidable on both the first puller means and the common strap so as to vary the location along their length at which they are permitted to diverge from one another, and retractor means comprising a spool coupled to the spindle of the inertia reel so as to be driven thereby and thus to reduce the effective length of the second puller means as said common strap is protracted from said inertia reel.

7. A motor vehicle according to claim 6, wherein the second puller means is attached to a common point on the vehicle as the first puller means.

8. A motor vehicle according to claim 7, wherein said common point of attachment of the puller means is movable.

9. A motor vehicle according to claim 8, wherein the point of attachment of the puller means comprises a slider mounted on a track, the end of which nearer to the door is higher than the other end thereof.

10. A motor vehicle according to claim 6, wherein the lap and shoulder straps are formed as a single continuous length running freely through a guide member which is attached to the common strap and the first puller means runs freely through the guide member and is attached to the shoulder strap at a point spaced from the guide member.

* * * * *